Sept. 16, 1941.                P. HEFTLER                    2,255,773
                        VIBRATIONLESS POWER PLANT
                         Filed Aug. 24, 1937          2 Sheets-Sheet 1
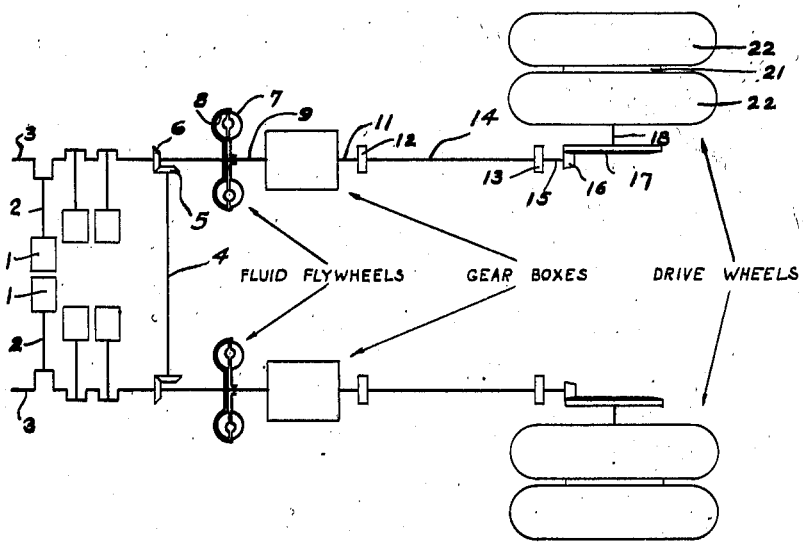
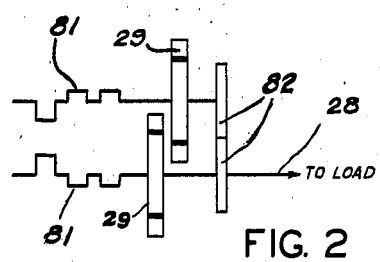
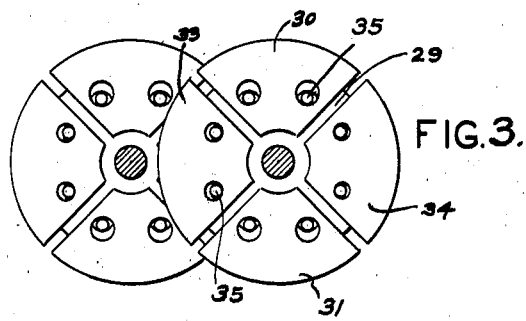
INVENTOR.
Paul Heftler Sept. 16, 1941.   P. HEFTLER   2,255,773
VIBRATIONLESS POWER PLANT
Filed Aug. 24, 1937   2 Sheets-Sheet 2

Inventor,
Paul Heftler

Patented Sept. 16, 1941

2,255,773

UNITED STATES PATENT OFFICE 2,255,773

VIBRATIONLESS POWER PLANT

Paul Heftler, Grosse Pointe Park, Mich.

Application August 24, 1937, Serial No. 160,655

4 Claims. (Cl. 60—97)

This invention relates to power plants in which the power is provided by an internal combustion engine, and the principal object of this invention is to provide such a power plant and arrange it so that it will be practically vibrationless. More particularly, it is an object of this invention to provide such a practically vibrationless power plant employing a Diesel engine having only a few injection pumps and nozzles, such as one, two or three pumps and nozzles, instead of six or more of each as now generally used.

Another object of this invention is to provide a method of generating power from the explosion of fuel in air in an engine, the method being one which is inherently vibrationless.

In all the internal combustion engines now in use, the power is generated in impulses by the explosion of separate charges of fuel and air in cylinders, and the power impulses are applied to a shaft, such as a crankshaft, in rapid succession. Since the shaft is a rotating shaft, the power impulses are in the form of torque impulses, and each torque impulse applied to the shaft is accompanied by an equal and opposite torque impulse applied to the block or frame of the engine. These impulses applied to the block or frame of the engine may be called "torque reaction impulses," and they are one of the principal causes of engine vibration. The elimination of this particular form of vibration is the principal object of this invention, since adequate means of eliminating the other forms of vibration are already well known and in use.

The only means now in use for minimizing or eliminating torque reaction impulse vibration are the provision of large numbers of cylinders in a single engine and the mounting of engines on "floating power" mountings. Good results can be obtained by these means, but, to get good results, it is generally considered necessary to have at least six separate cylinders. When the engine is a Diesel, the cost of the six injection pumps and nozzles is considerable and is often more than the cost of the entire rest of the engine.

According to this invention, the vibration caused by torque reaction impulses is eliminated by providing simultaneous and opposite torque reaction impulses which cancel each other instead of vibrating the engine. This is accomplished by making the engine double, that is by providing two crankshafts rotating synchronously and in phase and in opposite directions and by similarly duplicating the cylinders and pistons, and by preventing the torque impulses applied to the crankshafts from vibrating the rest of the engine. This latter point is especially important, for it has been neglected by prior designers and is the key to the problem. If the two crankshafts are merely connected together or to a third shaft by gears and the power all taken from the engine through one of the shafts, the loads on the bearings which support the gears will pulsate with the power impulses and will vibrate the whole engine just as much as if it had only a single crankshaft. The power impulses must be smoothed out so that there is a stream of smooth power from each crankshaft before the two streams are combined; this is one of the principal features of the invention.

The two streams of power can be smoothed out in various ways before being combined. One of the best ways is to use two fluid flywheels or hydraulic couplings, one on each crankshaft, and to combine the power from the two shafts after it has been smoothed out by the fluid flywheels. Another is to provide each crankshaft with a number of dynamic absorbers which will add and subtract torque impulses to and from the torque impulses from the cylinders in such a way that the total torque, and hence the power, will be smooth. Other devices, such as electromagnetic couplings which permit a slight slip, will also serve well.

These and other objects and features of the invention will be more readily understood from the following description and the accompanying drawings, in which:

Figure 1 is a diagrammatic representation of one form of the invention as applied to a motor bus or truck;

Figure 2 is a diagrammatic representation of another form of the invention;

Figure 3 is a detail of the form of the invention shown in Figure 2;

Figure 4:
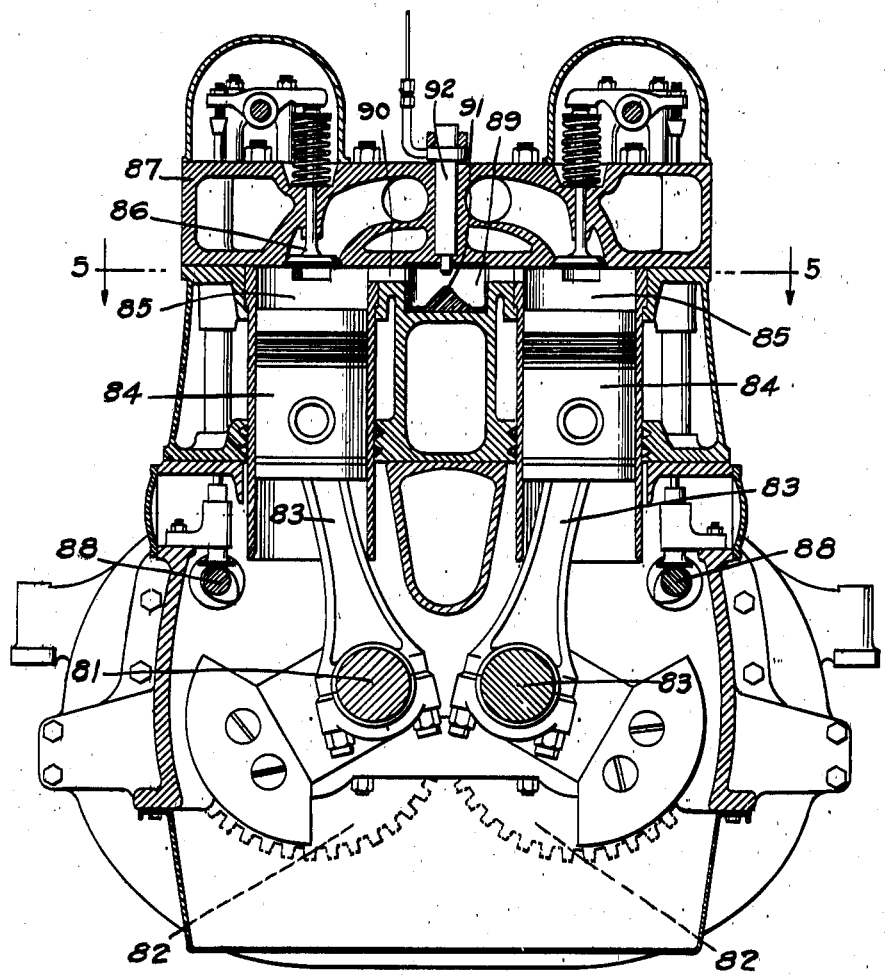
Figure 4 is a cross section of one form of engine suitable for use in carrying out the invention.

The form of the invention shown in Figure 1 consists of a flat three-cylinder engine having six opposed pistons 1, two in each cylinder, connected by connecting rods 2 to crankshafts 3 rotating synchronously in opposite directions. The two shafts 3 are kept in synchronism and in phase by a cross shaft 4 and bevel gears 5, 6. Each crankshaft 3 is connected to a power transmitting mechanism of the type described by Percy Martin in his United States Patent No. 1,885,746. Each transmission consists of a fluid flywheel whose outer member 7 is fixed to one of the crankshafts 3 of the engine, and whose inner member 8 is fixed to a shaft 9 extending back to a gearbox, which may be of the Wilson or equivalent type. The main shaft 11 of the gearbox is connected through universal joints 12, 13 and a propeller shaft 14 to one of the pinion shafts 15 of a rear axle. Each pinion shaft 15 carries a bevel pinion 16 which drives a bevel gear 17 mounted on an axle shaft 18. Each drive shaft 18 is connected to a drive wheel 21 upon which are mounted two tires 22, the drive wheels 21 being the rear wheels of a bus or truck.

In this form of the invention, the torque reaction impulses are balanced out in the engine, and the pulsations in the two streams of power from the two crankshafts 3 are smoothed out in the fluid flywheels before the two streams of power are applied to a single common element (the road) and united for a single purpose. Thus no vibration will exist outside of the engine, and the engine will, in effect, be vibrationless.

Figure 5:
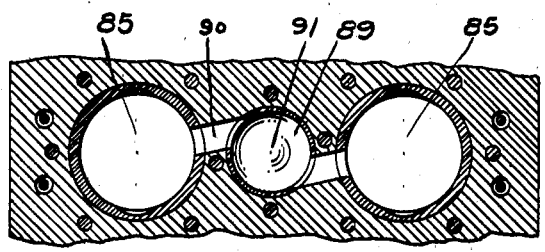
Figure 5 is a horizontal section on the line 5—5 of Figure 4, looking down in the direction of the arrows.

Another form of the invention is shown in Figures 2 to 5. This form of the invention consists of an engine having two three-throw crankshafts 81 connected together by gears 82 so that they rotate synchronously and in phase and in opposite directions. Each crankshaft carries connecting rods 83 which are joined to pistons 84 in cylinders 85 in the conventional manner. Each cylinder 85 is provided with conventional inlet valves 86 and exhaust valves placed in the head 87 and operated in the conventional manner from camshafts 88. Midway between the two cylinders is a round turbulence-type combustion chamber 89 connected to each of the two cylinders with which it is associated by transverse passages 90.

The bottom of the turbulence chamber 89 is formed with a central boss 91 so that an injection nozzle 92 having a conical spray may be used efficiently. It may be noted that there is thus only one injection nozzle and therefore only one injection pump for each pair of cylinders.

Each of the two crankshafts 81 carries a flywheel 29 upon which is mounted a plurality of dynamic absorbers of the type described by Mr. E. S. Taylor in the article entitled "Crankshaft torsional vibration in radial aircraft engines," published in the March, 1936 issue of the S. A. E. Journal. Each absorber has a portion lying on each side of the flywheel disc 29 and is secured to the disc by a pair of rollers 35 extending through holes in one side of the absorber, holes in the flywheel disc, and holes in the other side of the absorber. Two of the absorbers 30 and 31 are constructed to absorb vibrations having the frequency of the power impulses, one absorber 33 is constructed to absorb vibrations of double that frequency, and the last absorber 34 is constructed to absorb vibrations of four times that frequency. Thus, the largest component of torque variation which will remain will be the one having a frequency of eight times the power impulse frequency, and the power reaching the gears 82 will be as smooth as that coming from an engine having twenty-four cylinders on one crankshaft. Therefore, the forces exerted by the gears 82 upon their bearings will be substantially constant, and practically no vibration will be caused.

While I have shown and described only two forms of the invention, it will be obvious that it may be carried out in many other ways. For example, the fluid flywheels shown in the first form of the invention may be substituted for the dynamic absorbers in the second form of the invention, or vice versa. My invention, therefore, includes not only these particular forms but also any other that come within the terms of the following claims.

I claim:

1. An internal combustion engine and transmission comprising an engine block, two parallel crankshafts journaled in the block, means for constraining the crankshafts to rotate in synchronism and in opposite directions, at least one pair of pistons, one piston of each pair being connected to one crankshaft and the other to the other crankshaft and their cranks being placed so that the two pistons move in phase and displace equal volumes, means connected to each of the two crankshafts and including masses movable relative thereto to convert varying torque into smooth torque, and a single combustion chamber and injection nozzle for each pair of pistons to insure equal and simultaneous power impulses being delivered to the two crankshafts and correspondingly equal and simultaneous opposite torque reaction impulses being delivered to the engine block where they neutralize each other and cause no vibration.

2. The method of securing vibrationless mechanical power from power sources each of which produces power in the form of a varying torque applied between a relatively stationary member and a rotating shaft which consists in providing two such sources of power arranged so that their shafts are parallel and rotate in opposite directions and have torques with similar variations, supporting the relatively stationary members of said sources and insulating them against the transmission of a torque reaction to or from anything except each other, synchronizing the two power sources and placing them in phase so that their torque variations are and remain in phase, evening out the momentary variations in torque transmitted by each of the two shafts and then transmitting the evened-out torques to driven members coaxial with the shafts, and transmitting the varying torque reaction on each relatively stationary member to the other relatively stationary member.

3. A power plant comprising an internal combustion engine having two main shafts, pistons arranged in pairs, one piston of each pair being connected to each main shaft, means for constraining the two main shafts to rotate in synchronism and in opposite directions and for constraining the two pistons of each pair to move in synchronism, a pair of driven shafts in alignment with the main shafts, means on each main shaft to convert varying torque from the main shaft into smooth torque and to apply it to the driven shaft in alignment with said main shaft, and a single combustion chamber and set of injection equipment for each pair of pistons to insure equal and simultaneous power impulses being delivered to the two main shafts and correspondingly equal and simultaneous opposite torque reaction impulses being delivered to the stationary portion of the engine where they neutralize each other and cause no vibration.

4. An internal combustion engine power plant comprising an engine block, two parallel crankshafts journaled in the block, means for constraining the crankshafts to rotate in synchronism and in opposite directions, the throws of the two crankshafts being symmetrically arranged with respect to each other about a plane of symmetry lying between the crankshafts, a pair of pistons connected one to each crankshaft and constructed and arranged to simultaneously displace equal volumes as said crankshafts rotate, a single combustion chamber constructed and arranged to receive a charge of air compressed by said pistons and to apply to said pistons the pressure created by burning fuel in said air, a single fuel pump, and injection nozzle for injecting fuel into said combustion chamber, a pair of driven shafts coaxial with said crankshafts, and means on each crankshaft for converting varying torque from said crankshaft into smooth torque and for applying said smooth torque to the driven shaft coaxial with said crankshaft.

PAUL HEFTLER.